United States Patent
Parlange et al.

(10) Patent No.: US 7,845,568 B2
(45) Date of Patent: Dec. 7, 2010

(54) MANAGING POWER AND TIMING IN A SMART CARD DEVICE

(75) Inventors: Dominique Parlange, Trets (FR); Jean Pierre Enguent, Aix en Provence (FR); Romain Palmade, Auriol (FR)

(73) Assignee: Atmel Rousset S.A.S., Rousset Cedex ( * ) Notice: Subject to any disclaimer, the term of this patent is extended or adjusted under 35 U.S.C. 154(b) by 844 days.

(21) Appl. No.: 11/746,311

(22) Filed: May 9, 2007

(65) Prior Publication Data
US 2008/0277482 A1 Nov. 13, 2008

(51) Int. Cl.
*H04M 11/00* (2006.01)
*G06K 19/07* (2006.01)

(52) U.S. Cl. .................... 235/492; 455/406
(58) Field of Classification Search ............. 235/492; 455/406
See application file for complete search history.

(56) References Cited

U.S. PATENT DOCUMENTS

| | | | |
|---|---|---|---|
| 4,368,512 A | 1/1983 | Kyu et al. |
| 4,580,276 A | 4/1986 | Andruzzi et al. |
| 5,159,684 A | 10/1992 | Kroll et al. |
| 5,345,231 A | 9/1994 | Koo et al. |
| 5,371,736 A | 12/1994 | Evan |
| 5,457,786 A | 10/1995 | Roush |
| 5,668,810 A | 9/1997 | Cannella, Jr. |
| 5,758,127 A | 5/1998 | MacAulay et al. |
| 5,809,519 A | 9/1998 | Lee |
| 6,076,081 A | 6/2000 | Bass et al. |
| 6,199,764 B1 | 3/2001 | Tsai |
| 6,636,927 B1 | 10/2003 | Peters et al. |
| 6,776,339 B2 | 8/2004 | Piikivi |
| 6,859,650 B1 | 2/2005 | Ritter |
| 6,908,037 B2 | 6/2005 | Kim |
| 6,931,470 B2 | 8/2005 | Ballantyne et al. |
| 6,962,293 B2 | 11/2005 | Kim |

(Continued)

FOREIGN PATENT DOCUMENTS

EP      1233531      8/2002

(Continued)

OTHER PUBLICATIONS

Atmel Corporation, International Search Report & Written Opinion, PCT/US2008/063311, mailed Dec. 17, 2008, 22 pages.

(Continued)

*Primary Examiner*—Daniel A Hess
(74) *Attorney, Agent, or Firm*—Fish & Richardson P.C.

(57) ABSTRACT

In some implementations, a mobile device includes a first interface configured to communicably couple to a removable integrated circuit card; a second interface configured to wirelessly communicate with a contactless reader that is external to the mobile device; a communication interface that couples the first interface and the second interface and that is configured to obtain information from an integrated circuit card that is coupled to the first interface in response to receipt by the second interface of an information request from the contactless reader; and a programmable timer that is configured to be started in response to the second interface receiving an information request from the contactless reader, and that is further configured to, upon reaching a programmed value, cause the second interface to transmit the obtained information to the contactless reader.

24 Claims, 4 Drawing Sheets

U.S. PATENT DOCUMENTS

| | | |
|---|---|---|
| 7,114,093 B2 | 9/2006 | Tardieux et al. |
| 7,127,236 B2 | 10/2006 | Khan et al. |
| 7,191,262 B2 | 3/2007 | Sleeman |
| 7,228,372 B2 | 6/2007 | Yoshimura et al. |
| 7,252,242 B2 * | 8/2007 | Ho .................. 235/492 |
| 7,305,510 B2 | 12/2007 | Miller |
| 2002/0086704 A1 | 7/2002 | Meindl et al. |
| 2003/0189096 A1 | 10/2003 | Markkanen et al. |
| 2004/0029569 A1 | 2/2004 | Khan et al. |
| 2004/0030601 A1 | 2/2004 | Pond et al. |
| 2004/0065734 A1 | 4/2004 | Piikivi |
| 2004/0127256 A1 | 7/2004 | Goldthwaite et al. |
| 2004/0208066 A1 | 10/2004 | Burky et al. |
| 2005/0045720 A1 | 3/2005 | Fruhauf |
| 2005/0108571 A1 | 5/2005 | Lu et al. |
| 2005/0238149 A1 | 10/2005 | De Leon |
| 2006/0000900 A1 | 1/2006 | Fernandes et al. |
| 2006/0022044 A1 | 2/2006 | Smets et al. |
| 2006/0049258 A1 | 3/2006 | Piikivi |
| 2006/0094356 A1 | 5/2006 | Dawidowsky |
| 2006/0155913 A1 | 7/2006 | Nishikawa et al. |
| 2006/0165060 A1 | 7/2006 | Dua |
| 2008/0147923 A1 | 6/2008 | Renahy et al. |

FOREIGN PATENT DOCUMENTS

| | | |
|---|---|---|
| EP | 1610256 | 12/2005 |
| JP | 2006-114054 | 4/2006 |
| WO | WO 00/74406 | 12/2000 |

OTHER PUBLICATIONS

Scientific Atlanta, "Digital Broadband Delivery System Phase 1.0—System Overview".

Atmel "Secure Microcontroller for Next-Generation (U)SIM Cards AT91SC512384RCT".

Atmel, "AT91SC512384RCT Next Generation of (U)SIM ICs".

International Search Report & Written Opinion, PCT/US2007/080420, mailed Apr. 24, 2008, 11 pages.

"Philips and SKT join forces to simplify NFC development around the world," NXP press release, May 17, 2006, available at http://www.nxp.com/news/content/file_1237.html.

"Reader to Reader technology," Inside Contactless, Jul. 30, 2004, available at http://www.smartcard.co.uk/articles/R2R%20Technology%201_0.pdf.

"Picoread and Picoread Chipset," Inside Contactless, available at http://www.insidecontactless.com/products/picoread_suite.php (last accessed Jan. 29, 2007).

ISO/IEC 14443-2 "Identification cards—Contactless integrated circuit(s)—Proximity cards. Part 2; Radio frequency power and signal interface," Jul. 1, 2001, 18 pages.

ISO/IEC 14443-3 "Identification cards—Contactless integrated circuit(s)—Proximity cards. Part 3: Initialization and anticollision," Feb. 1, 2001, 58 pages.

Microchip PIC18F6585/8585/6680/8680 Data Sheet, (2004), pp. 1-31, 109-123, 125-154, 189-227 and 275-343.

Invitation to Pay Fees PCT/US2008/063311, mailed Aug. 26, 2008, 8 pages.

* cited by examiner

MANAGING POWER AND TIMING IN A SMART CARD DEVICE

BACKGROUND

Secure integrated circuits, commonly referred to as smart cards, can be of the form of an embedded integrated circuit hardware device roughly the size of a credit card, or smaller, and can be used in many applications. For example, smart cards can be used in ticketing applications in mass transit systems, access control applications, parking/toll applications, electronic wallet applications, identification authentication applications, and other applications in which information of some type must be securely stored.

In some implementations, a small form factor smart card is used in a mobile device (e.g., a smartphone or cell phone handset) to identify a user of the mobile device, a preferred wireless network to which the device is configured to connect, a wireless service account associated with the device or with the user, mobile device preferences or other information. For example, GSM (Global System for Mobile Communications) handsets generally employ smart cards commonly referred to as SIM (Subscriber Identity Module) cards; UMTS (Universal Mobile Telecommunications System) and other 3G (third generation) handsets generally employ USIM cards (Universal Subscriber Identity Module); and Code Division Multiple Access (CDMA) phones can employ RUIM (Removable User Identity Module) cards. With a SIM, USIM or RUIM card, a user can, in some implementations, transfer his or her wireless account and mobile device settings and preferences from one handset to another.

SUMMARY

In some implementations, a mobile device includes a first interface configured to communicably couple to a removable integrated circuit card; a second interface configured to wirelessly communicate with a contactless reader that is external to the mobile device; and a communication interface that couples the first interface and the second interface. The communication interface can be configured to obtain information from a removable integrated circuit card that is coupled to the first interface and transmit the obtained information via the second interface to the contactless reader. The second interface can be configured to receive power that is radiated by the contactless reader. At least one of the first interface, the second interface and the communication interface can include a power storage device that is configured to store power received by the second interface and provide stored power to the first interface, the second interface and the communication interface.

In some implementations, the mobile device further includes digital circuitry configured to provide information management functionality to a user of the mobile device. In some implementations, the mobile device further includes digital circuitry configured to provide wireless communication functionality to a user of the mobile device, where the first interface is configured to obtain information, from the integrated circuit card coupled to the first interface, that identifies at least one of a user of the mobile device, a wireless communication account associated with the mobile device, or a preferred wireless communication network to which the mobile device is configured to connect.

The integrated circuit card can be, for example, a universal integrated circuit card (UICC) smart card configured to run at least one of a Subscriber Identity Module (SIM) application or a Universal Subscriber Identity Module (USIM) application. As another example, the integrated circuit card can be a Removable User Identity Module (RUIM). In some implementations, the second interface is substantially compliant with at least one of International Organization for Standardization (ISO) standard 14443 type A communication, ISO standard 14443 type B communication, or ISO standard 15693 communication.

The power storage device can be configured to selectively provide stored power to the first interface, the second interface and the communication interface when sufficient power is not available from a different, primary power storage device included in the mobile device. Power radiated by the contactless reader can be radiated discontinuously.

In some implementations, the communication interface is configured to obtain the information from the removable integrated circuit card upon receipt by the second interface of an information request from the contactless reader. The mobile device can further include a programmable timer that is configured to be started in response to receipt by the second interface of the information request. The second interface can be configured to transition to a reduced-power mode when the programmable timer is started. The second interface can be configured to transition from the reduced-power mode to an operating mode when the programmable timer reaches a predetermined value, and following transition to the operating mode, to transmit the information obtained from the removable integrated circuit card to the contactless reader.

In some implementations, a mobile device includes a first interface configured to communicably couple to a removable integrated circuit card; a second interface configured to wirelessly communicate with a contactless reader that is external to the mobile device; a communication interface that couples the first interface and the second interface and that is configured to obtain information from an integrated circuit card that is coupled to the first interface in response to receipt by the second interface of an information request from the contactless reader; and a programmable timer that is configured to be started in response to the second interface receiving an information request from the contactless reader, and that is further configured to, upon reaching a programmed value, cause the second interface to transmit the obtained information to the contactless reader.

In some implementations, a method includes receiving at a first interface an information request from an external contactless reader; obtaining information that is responsive to the received information request from an integrated circuit card coupled to a second interface; providing the obtained information to the contactless reader after a predetermined period of time has elapsed from a time the information request is received at the first interface; and maintaining the first interface in a reduced-power mode after the information request is received at the first interface and before the predetermined period of time has elapsed.

The method can further include receiving power that is radiated from the contactless reader. Receiving power can include receiving power that is radiated in a discontinuous manner from the contactless reader. The method can further include storing the received power, and providing stored power to the first interface and the second interface. Providing stored power to the first interface and the second interface can include selectively providing stored power when sufficient power is not available from a primary power storage device associated with the mobile device.

The method can further include detecting the presence of the contactless reader in close proximity to the mobile device. Detecting the presence of the contactless reader can include detecting power that is radiated from the contactless reader.

Providing the obtained information to the contactless reader can include providing the obtained information in substantial compliance with at least one of ISO Standard 14443 or ISO Standard 15693. The predetermined period can selected based on timing parameters characterized by either ISO standard 14443 or ISO Standard 15693, and information-processing delays in the first interface and the second interface.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

A conventional smart card interface is briefly described. A conventional smart card reader radiates an interrogation signal (e.g., a time-varying electromagnetic field having a modulated carrier frequency) that is used to communicate information to a smart card. A conventional smart card includes a current loop on which a voltage is induced when the smart card is physically within range (e.g., within the time-varying electromagnetic field) of the smart card reader. By varying the signal (e.g., by modulating the amplitude of time-varying electromagnetic field), the smart card reader can modulate the voltage induced in the smart card and thereby communicate information to the smart card. To communicate back to the smart card reader, the smart card can modulate the inductive load of its current loop. Because of mutual inductance between the smart card reader and the current loop in the smart card, changes in the inductive load of the current loop are detectible at the smart card reader (e.g., as changes to the time-varying electromagnetic field).

In addition to communicating information to the smart card, the interrogation signal (e.g., time-varying electromagnetic field) can also provide power to the smart card. In some implementations, the interrogation signal is of the form of an electromagnetic field that is continuously time-varying and whose amplitude is modulated by only a small fraction. For example, in ISO Standard 14443 type B communication, the amplitude is modulated by a nominal 10%. In such implementations, some amount of power is continuously radiated by the smart card reader and is accordingly available to a smart card within range of the electromagnetic field. In some implementations, amplitude modulation is more significant, and the transfer of power from the smart card reader to the smart card can be periodically interrupted. For example, in ISO 14443 type A communication, amplitude can be modulated by a nominal 100% to communicate a "pause," during which time no significant amount of power is radiated by the smart card reader. Accordingly, to support ISO 14443 type A communication, smart cards can store power (e.g., in a capacitive power storage element) for use during short periods of time (e.g., pauses) when sufficient power is not available from the smart card reader.

Timing of communication between a conventional smart card reader and a smart card is generally very precise. For example, in order for a smart card reader to recognize a smart card within its electromagnetic field, the smart card may be required to respond within a precisely defined window of time, to a request for information from the smart card reader. In particular, for example, certain responses to ISO 14443 type A communications should be made 86.4 µS after a corresponding request.

Figure 1A:
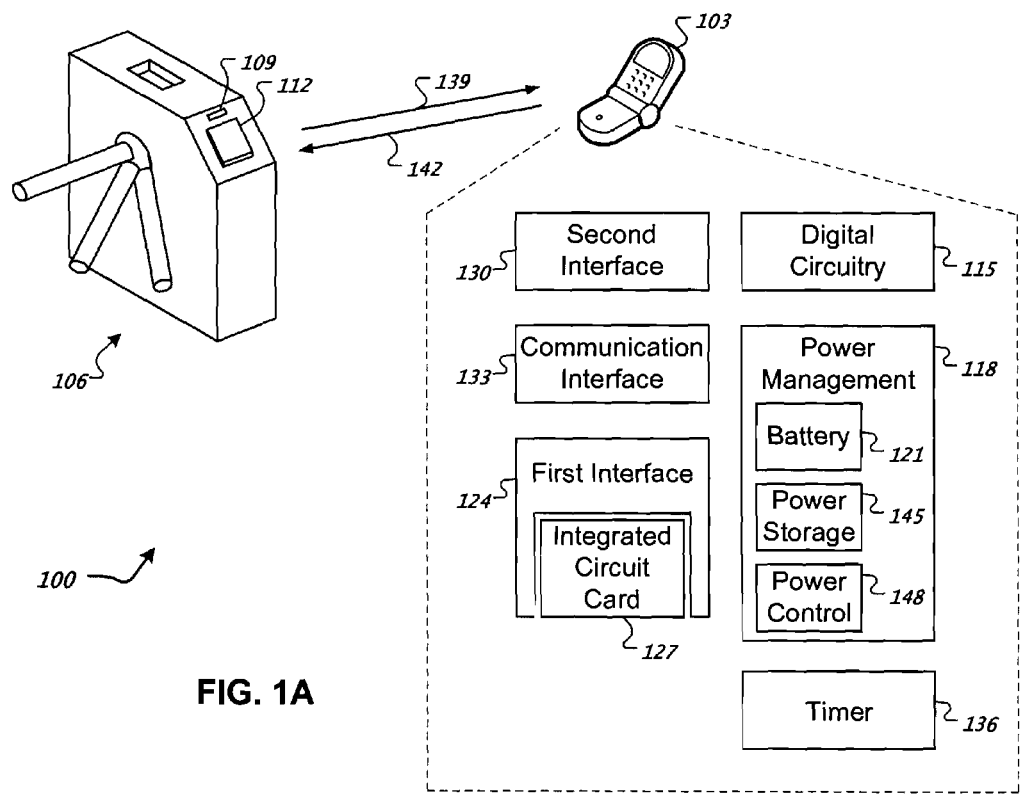
FIG. 1A is a diagram of an example environment in which a mobile device can be used in a smart card application.

FIG. 1A illustrates an example application 100 in which a mobile device (depicted as a cell phone 103) can be used in a smart card application, such as a mass transit ticketing application. In particular, FIG. 1A illustrates an application in which the cell phone 103 can be used to gain access to a mass transit system, (e.g., through a turnstile 106). As shown, the turnstile 106 can include a conventional paper ticket acceptor 109, as well as a contactless reader 112 (e.g., a smart card reader) that can be used to authenticate a smart card or smart card-enabled device, such as the cell phone 103.

Other applications are contemplated. In particular, the example smart card-enabled cell phone 103 shown in FIG. 1A and described herein can be used in smart card applications outside of a mass-transit environment (e.g., access control applications, digital wallet applications, identification authentication applications, etc.). Moreover, a single mobile device, such as the cell phone 103, can, in some implementations, be used in place of multiple smart cards in multiple different smart card applications. Furthermore, the mobile device can be any kind of mobile device that can securely store information, such as, for example, a cell phone, smartphone, personal digital assistant, laptop computer, music player, portable memory device, etc.

The cell phone 103, as shown in one implementation, includes digital circuitry 115 to implement, for example, wireless communication (e.g., via a GSM or CDMA network); power management components 118 including, for example, a battery 121; and a first interface 124 configured to receive an integrated circuit card 127, such as, for example, a SIM, USIM or RUIM card. In some implementations, the digital circuitry 115 employs the first interface 124 to access data in the integrated circuit card 127 to identify a wireless account associated with the user of the cell phone 103, a preferred wireless network to which the cell phone 103 is configured to connect, or other settings or preferences associated with the cell phone 103. In such implementations, the integrated circuit card 127 can be removable and can be configured to function in a different, similarly provisioned mobile device (e.g., a cell phone or smartphone), to allow a user to transfer his or her device settings and wireless network access account information from the cell phone 103 to another device.

In one implementation as shown, the cell phone 103 includes additional components that allow the cell phone to function in smart card applications, (e.g., authenticating a user and subsequently providing access to a mass transit system through the turnstile 106). In particular, the cell phone 103 can include a second interface 130 that is configured to communicate with a contactless reader 112, for example, by receiving and transmitting signals according to an appropriate protocol, such a protocol that is characterized by ISO 14443 or ISO 15693. In addition, the cell phone 103 can include a communication interface 133 that couples the first interface 124 with the second interface 130, such that the second interface 130 can access and transmit secure information stored in the integrated circuit card 127 to the contactless reader 112, as is described in greater detail with reference to FIG. 2.

The cell phone 103 can also include a timer module 136 that is configured to control timing of communication between the second interface 130 and the contactless reader 112. For example, as described above, precise timing can be important between a request 139 from the contactless reader 112 and a response 142 from the cell phone 103, and the timer module 136 can control this timing. In particular, in some implementations, the timer module 136 includes a programmable timer that is started when a request 139 from the contactless reader 112 is received by the second interface 130. The second interface 130, communication interface 133 and first interface 124 can be employed to retrieve responsive information, and when the programmable timer in the programmable timer module 136 reaches a predetermined, programmed value, the retrieved responsive information can be provided by the second interface 130 to the contactless reader 112 as the response 142.

In some implementations, the second interface 130 is configured to receive power from the contactless reader 112 (e.g., power that is radiated in the form of a time-varying electromagnetic field). The received power can, in some implementations, be used to power the second interface 130, communication interface 133 and/or first interface 124 during communication sessions between the cell phone 103 and the contactless reader 112. In this manner, the cell phone 103 can be used in smart card applications even if other power is not available (e.g., when the battery 121 is dead).

To enable smart card applications even when power is not continuously radiated by the contactless reader 112, the cell phone 103 can include a power storage module 145 to store power that is received by the second interface 130 from the contactless reader 112, and supply the stored power to the second interface 130, communication interface 133 and/or first interface 124. A power control module 148 can manage the storing and providing of power in and by the power storage module 145. In some implementations, the power control module 148 can also perform other functions that are described below.

Figure 1B:
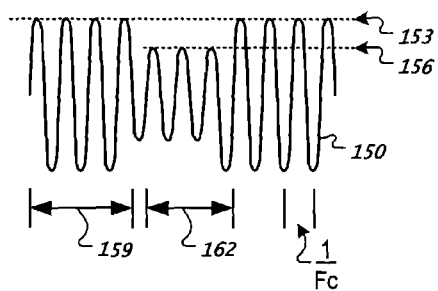
FIGS. 1B and 1C are diagrams of example signals that can be radiated from a smart card reader that is included in the example environment shown in FIG. 1A.

FIG. 1B illustrates an example signal that can be provided by the contactless reader 112 to communicate information and power to a smart card or smart card-enabled device ("receiving device"), such as the cell phone 103. In some implementations, the signal 150 is a time-varying electromagnetic field that is radiated by the contactless reader 112. As shown in one implementation, the time-varying electromagnetic field can have a nominal amplitude 153 and frequency $f_c$ corresponding to a carrier frequency. To communicate information, the amplitude can be modulated, for example, to a modulated amplitude 156. The modulated, time-varying electromagnetic field can induce a voltage in the receiving device, when the receiving device is within the field. For example, the continuous time-varying nature of the electromagnetic field can induce a continuous (alternating current) voltage (e.g., in a current loop of the receiving device), which can be used, in some implementations, to provide power to corresponding circuitry in the receiving device, and the modulation and amplitude (and corresponding modulation in induced voltage) can be detected by the receiving device as communication from the contactless reader. In particular, in some implementations, a period 159 during which the amplitude of the electromagnetic field is at a nominal value 153 can be received as a first value (e.g., a digital '1'), and a period 162 during which the amplitude of the electromagnetic field is at a modulated value 156 can be received as a second value (e.g., a digital '0'). In this manner, digital information can be communicated by the contactless reader 112 to the receiving device 130.

As a specific example, the signal 150 shown in FIG. 1B can correspond to a time-varying electromagnetic field characterized by ISO Standard 14443 type B communication. In particular, the frequency $f_c$ can be 13.56 MHz, the nominal amplitude of the electromagnetic field can be in a range of 1.5 A/m and 7.5 A/m (at a specified distance from the contactless reader 112) and the modulated amplitude can be approximately 90% of the nominal amplitude (e.g., to implement 10% amplitude-shift keying (10% ASK)).

Figure 1C:
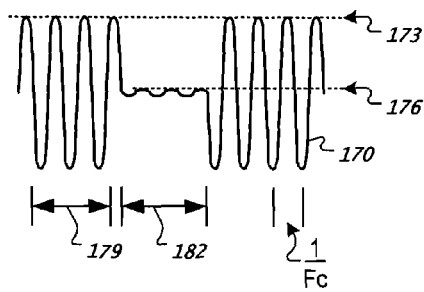

FIG. 1C illustrates another example signal 170 that can be provided by the contactless reader 112 to communicate information and power to the receiving device 103. The implementation shown depicts a signal 170 (e.g., a time-varying electromagnetic field) that has a nominal amplitude 173 and frequency $f_c$ corresponding to a carrier frequency. The amplitude of the signal 170 can be modulated to communicate information in the same manner as by the signal 150, but the amplitude of the signal 170 can be modulated more significantly than the modulated amplitude 156 of the signal 150. In particular, the amplitude of the signal 170 can be modulated a nominal 100% (e.g., to implement 100% ASK communication, or on-off-keying (OOK)). As in the case of the signal 150, a period 179, during which the amplitude of the electromagnetic field is at a nominal value 173, can correspond to a first value (e.g., a digital '1'), and a period 182, during which the amplitude of the electromagnetic field is at a modulated value 176, can correspond to a second value (e.g., a digital '0').

As depicted in FIG. 1C, nominal modulation of 100% may, within device tolerances, lead to an actual modulation of about 95% (e.g., resulting in some small amount of time-variation to the field, as shown). However, in some implementations, any remaining time-varying nature of the signal 170 during the period 182 is not sufficient to radiate significant power to the receiving device. Accordingly, to function solely with power radiated by the contactless reader 112, the receiving device, in some implementations, stores power that is received during the period 179 and uses the stored power during the period 182.

As a specific example, the signal 170 shown in FIG. 1C can correspond to a time-varying electromagnetic field characterized by ISO Standard 14443 type A communication. In particular, the frequency $f_c$ can be 13.56 MHz, the nominal amplitude of the electromagnetic field can be in the range of 1.5 A/m to 7.5 A/m (at a specified distance from the contactless reader 112), and the modulated amplitude 176 can be less than 5% of the nominal amplitude 173 (e.g., to implement 100% ASK).

Two example implementations are shown in FIGS. 1B and 1C. Other variations are possible and contemplated. For example, multiple modulation levels can be employed rather than just two levels. Other forms of modulation can also be employed, such as, for example, frequency modulation.

Figure 2:
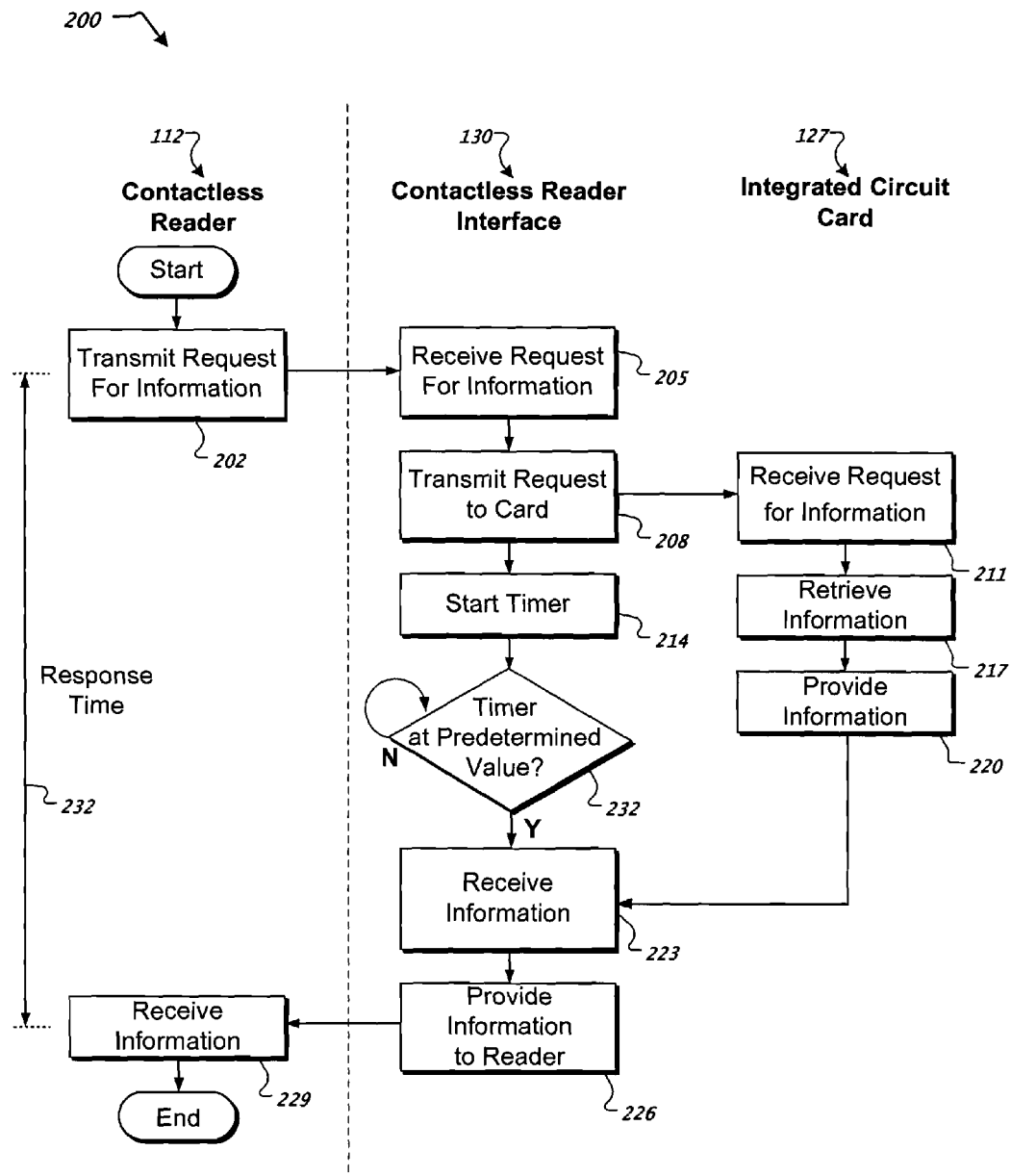
FIG. 2 is a flow diagram of an example transaction between a contactless reader (e.g., a smart card reader) and a mobile device.

FIG. 2 is a flow diagram illustrating aspects of an example communication session 200 between the contactless reader 112 and the cell phone 103. The communication session can be, for example, a session in which the cell phone 103 is used to authenticate a user as a valid ticket holder in a mass transit system and subsequently grant the user/ticket holder access to the mass transit system, e.g., through the turnstile 106 that is shown in FIG. 1A. Other applications are possible.

As shown in FIG. 2, the communication session 200 includes a transmission (202) by the contactless reader 112 of a request for information. In some implementations, the request for information is in response to a previous detection by the contactless reader 112 of a smart card or smart card-enabled device in close enough proximity to the contactless reader 112 to enable communication between the reader 112 and the device (e.g., the cell phone 103)

A contactless reader interface (e.g., the second interface 130) can receive (205) the request and transmit (208) the request to an integrated circuit card in which corresponding information is securely stored. For example, with reference to FIG. 1A, the second interface 130 can receive (205) the request 139 for information from the contactless reader 112 (e.g., by detecting modulation of voltage induced in the second interface 130 by signals radiated by the contactless interface that are of the form shown in FIG. 1B or FIG. 1C). The second interface 130 can transmit (208) the received request for information to the corresponding integrated circuit card 127 (e.g., a SIM card), for example, through the communication interface 133 and the first interface 124, and the integrated circuit card can receive (211) the request for information.

In some implementations, after transmitting (208) the request for information to the corresponding integrated circuit card 127, the contactless reader interface 130 can cause a timer to be started (214). For example, in some implementations, the second interface 130 causes the timer 136 to begin counting down from a predetermined value. In other implementations, the counter 136 is started and begins counting up to a predetermined value. The predetermined value can be selected based on timing requirements for communications between the contactless reader 112 and the receiving device (e.g., timing requirements characterized by ISO 14443 type A communications).

After receiving (211) the request for information, the integrated circuit card can retrieve (217) corresponding information. Retrieving (217) the corresponding information can include, for example, decrypting the request, retrieving information responsive to the decrypted request from a secure memory included in the integrated circuit card, and encrypting the retrieved information in some manner. The retrieved (possibly encrypted) information can be provided (220) to the contactless reader interface 130, which, in turn, can receive (223) the information. The contactless reader interface 130 can then provide (226) the information to the contactless reader 112, which can also subsequently receive (229) the information.

In some implementations, the request for information includes a request for identification information. Upon receiving responsive information, a system coupled to the contactless reader 112 (not shown) can determine whether the received (229) responsive information corresponds to a valid user or ticket holder. If it does so correspond, the system can grant access to the user/ticket holder (e.g., by unlocking the turnstile 106 that is shown in FIG. 1A).

In some implementations, the retrieved information is not provided by the integrated circuit card 127 until it is determined (232) that the timer 136 has reached a predetermined value. For example, in some implementations, the information is retrieved from the integrated circuit card 127 upon receipt by the integrated circuit card 127 of the request from the contactless reader interface 130 (or from the communication interface 133 and/or other interface interposed between the integrated circuit card 127 and the contactless reader interface 130) but only provided to the contactless reader 112 after the timer 136 reaches the predetermined value (as shown). When the contactless reader interface 130 receives (223) the information, it can provide (226) it to the contactless reader 112. In other implementations (not shown) the contactless reader interface 130 can receive (223) the information as soon as it is available from the integrated circuit card 127, but can hold off providing (226) the received information to the contactless reader 112 until the timer 136 reaches a predetermined value.

The timer module 136 and associated timer function can be implemented in many ways. For example, a timer can be started when timing of an event is to begin, and the timer can count down and trigger another event when it reaches a zero value. As another example, a timer (e.g., digital timer) can be cleared, started when timing of an event is to begin, and the timer can count up to a predetermined value. Upon reaching the predetermined value, the timer can cause another event to occur. As another example, a timing function can be implemented with an analog circuit, such as an RC, RL or RLC circuit, and a corresponding predetermined period of time can be marked by a time for a voltage or current to change from a first value to a second value.

The actual period of time tracked by the timer or timer function can be selected such that overall response time 232 from transmission (202) of a request for the information from the contactless reader 112 to the corresponding receipt (229) of a response is within specified requirements, e.g., of a corresponding communication protocol. For example, in ISO 14443 type A communication, certain responses from smart cards or smart card-enabled devices are only recognized if provided 86.4 µS, after a corresponding request. In such communication, the timer 136 can be configured or tuned such that the time marked by the timer 136, plus latencies associated with various interfaces (e.g., latencies to transmit and receive the initial request and provide and receive the corresponding response) yield appropriate timing (e.g., 86.4 µS in some implementations).

FIG. 2 depicts only a representative portion of a typical communication session between an example contactless reader and an example device having a corresponding contactless interface. For example, a communication session can include several bi-directional exchanges of information. In particular, in some implementations, an ISO 14443 contactless reader repeatedly (e.g., substantially continuously) broadcasts a "request" command (e.g., REQA or REQB (Request Type A or Request Type B)) or "wake up" command (e.g., WUPA or WUPB (Wake Up Command Type A or B)) that solicits an "answer" command (ATQA or ATQB (Answer to Request Type A or B)) from a smart card or smart card-enabled device ("receiving device") 103 in functional proximity to the contactless reader. Subsequent to receiving an ATQA or ATQB command, the contactless reader can transmit an actual request for information, such as a request for identification information. Such a request can, in some implementations, include several exchanges of information. For example, the contactless reader 112 may initially send an encryption key, the receipt of which can be acknowledged by the receiving device 103. Subsequently, the contactless reader 112 can request identification information, and the receiving device 103 can use the previously provided encryption key to decrypt responsive identification information before providing it to the contactless reader 112. In response to receiving the responsive identification information, the contactless reader 112 can request additional information or send additional instructions to the receiving device. In particular, for example, the contactless reader 112 can transmit an instruction to the receiving device 103 to cause the receiving device 103 to record a transaction or debit a value stored in the receiving device 103 that represents, for example, a ticket or a digital monetary account. Other communications are possible and contemplated.

In some implementations, each discrete exchange of information can have its own timing parameters. For example, in some exchanges of information, the timer module 136 can be programmed such that the response time 232 is 86.4 µS; for other exchanges, the timer module 136 could be programmed such that the response time 232 is, for example, 91.2 µS, 95.9 µS, 100.6 µS, or some other value.

In some implementations, various components can be transitioned to a reduced-power mode during portions of a communication session. For example, while the integrated circuit card 127 is retrieving (217) information, the contactless reader interface 130, and other interfaces interposed between the contactless reader 112 and the integrated circuit card 127, can be powered off or transitioned to a reduced-power mode. Such reduced-power modes can be useful in conserving energy in the receiving device 103, and can be particularly useful when the receiving device 103 is powered solely by signals that are radiated by the contactless reader 112—especially if the power is periodically stored because of not being continuously radiated by the contactless interface, as depicted by FIG. 1C.

While the timer is depicted as being started by and in the contactless reader interface 130, in some implementations the timer can be started in response to operations performed by or in the integrated circuit card 127 or by some other interface that is not shown (e.g., the communication interface 133 or the digital circuitry 115).

Figure 3:
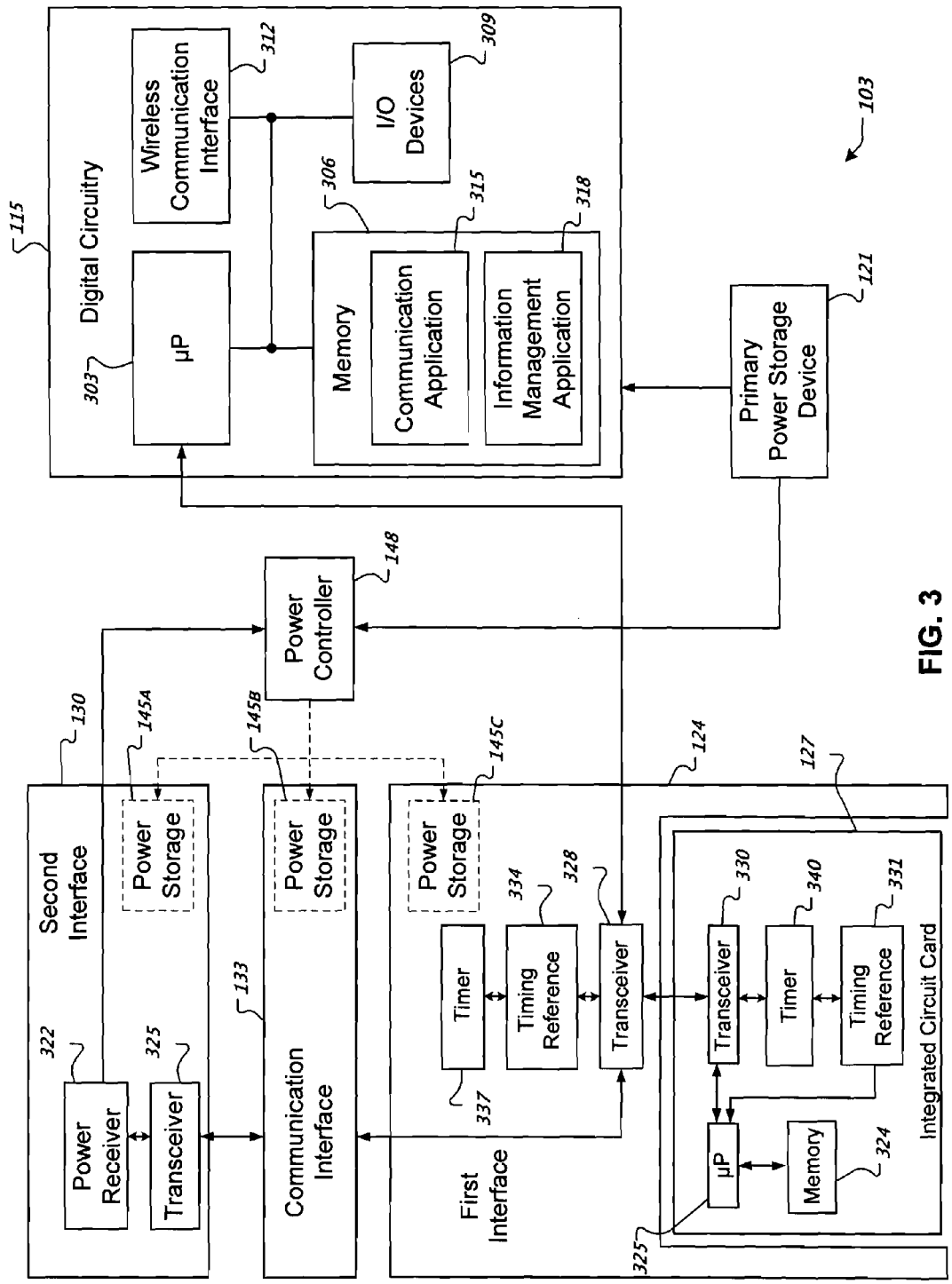
FIG. 3 is a block diagram showing additional example details of the mobile device shown in FIG. 1A.

FIG. 3 illustrates additional details of the example mobile device in FIG. 1A (depicted by cell phone 103). In the implementation shown in FIG. 3, the digital circuitry 115 includes a microprocessor 303, memory 306, I/O devices 309 and a wireless communication interface 312. The microprocessor 303 can be configured to retrieve and execute programming instructions that are stored in the memory 306. Different program instructions can comprise various application programs, such as, for example, a communication application 315 that implements voice communication, facilitates storage of or access to voice mail, enables the sending and receiving of text messages or other multimedia files, etc. As another example, an information management application 318 can provide a calendar application for tracking appointments and managing tasks, a database of contact information, and other conventional productivity tools.

Execution of certain programming instructions can cause the microprocessor 303 to receive input from one of the I/O devices 309 or provide output to one of the I/O devices 309. Execution of other instructions can cause the microprocessor 303 to receive data from or provide data to the wireless communication interface 312. The I/O devices 309 can include various devices through which a user can interact with the mobile device 103, such as, for example, a keypad, display, microphone, speaker, camera, alert devices (LEDs, tactile feedback devices), etc. The wireless communication interface 312 can implement various forms of communication, such as, for example, communication over TDMA, CDMA, GSM, 3G or other types of wireless networks.

The mobile device 103 can include a primary power storage device 121, such as, for example, a rechargeable battery (e.g., NiMH, Li-ion, NiCd, etc.). In some implementations, the primary power storage device 121 provides power to each of the components of the mobile device 103 when it has sufficient stored power to do so. In some implementations, when the power available from the primary power storage device 121 drops below a threshold level, various components in the mobile device 103 can be powered off or down such as, for example, the digital circuitry 115.

The mobile device 103 also includes the first interface 124 which can be configured to physically receive and electrically communicate with an integrated circuit card (e.g., a removable SIM, USIM or RUIM card). For example, in some implementations, the first interface 124 is configured to retrieve from the integrated circuit card 127 information such as a preferred wireless network to which the wireless communication interface 312 is to connect, a wireless service account associated with the device 103 or with the user of the device, or other preferences for the device 103 (e.g., preferences related to customizable aspects of one or more of the I/O devices 109).

As described above, the second interface 130 can be configured to communicate with a contactless interface, such as the contactless reader 112 (e.g., smart card reader) that is shown in FIG. 1A. The second interface 130 can include a power receiver 322, which in some implementations, includes a current loop (not shown) in which a voltage is induced when the current loop is physically positioned within a time-varying electromagnetic field radiated by the contactless reader 112. The second interface 130 can also include a transceiver 325 that sends and receives data to and from the contactless reader 112 and that also sends and receives data to and from other portions of the device 103 (e.g., such as the communication interface 133, which is described in greater detail below).

In some implementations, to receive data from the contactless reader 112, the transceiver 325 detects variations in a voltage that is induced in the power receiver 322. For example, the transceiver can, in some implementations, detect a first voltage that corresponds to a first amplitude of a carrier signal radiated by the contactless reader 112 (e.g., the amplitude 153 or 173, shown in FIG. 1B or 1C), and a second voltage that corresponds to a second amplitude of a carrier signal radiated by the contactless reader (e.g., the amplitude 156 or 176). In some implementations, to communicate data to the contactless reader 112, the transceiver 325 can modulate the inductive load of the power receiver 322 in a manner that is detectible by the contactless reader 112.

In some implementations, the second interface 130 can include additional circuitry (not shown) for decoding incoming signals or encoding outgoing signals, such as, for example, clock recovery circuitry, one or more buffers, circuitry for extracting data packets from higher-level protocol frames, or circuitry for inserting data packets into higher-level protocol frames, etc.

As shown in one implementation, the communication interface 133 can couple the first interface 124 and the second interface 130, and in particular, the transceiver 325 in the second interface 130 with a transceiver 328 in the first interface 124. In some implementations, the communication interface 133 is a parallel interface (e.g., adhering to a small computer systems interface (SCSI), a peripheral component interconnect (PCI) bus, an IEEE (Institute of Electrical and Electronics Engineers) 1284 parallel bus, etc.). In some implementations, the communication interface 133 is a serial interface (e.g., adhering to a serial peripheral interface (SPI) protocol, an interface-integrated circuit ($I^2C$) protocol, a 1-wire protocol, a system management bus (SMBus) protocol, or a proprietary communication protocol).

To control timing of different operations and/or synchronize communication between components of the device 103, one or more timing references can be provided. For example, as shown in one implementation, the integrated circuit card 127 includes a timing reference 331, and the first interface 124 also includes a timing reference 334. In some implementations, the timing reference 331 can be, for example, an oscillator, a crystal, a clock generator or a clock recovery circuit that recovers a clock signal from signals received by the transceiver 330. Similarly, the timing reference 334 can also be, for example, an oscillator, a crystal, a clock generator or a clock recovery circuit that recovers a clock signal from signals received by the transceiver 328. In some implementations, the timing reference 331 can provide a clock signal to the microprocessor 325, and the timing reference 334 can provide a clock signal to the transceiver 328, for example to synchronize data that is received or transmitted by the transceiver 328. In some implementations, only a single timing reference is needed by the first interface 124 and the integrated circuit card 127, and accordingly, only one of the timing reference 334 or 331 may be present.

In some implementations, either or both of the first interface 124 and the integrated circuit card 127 includes a timer 337 or 340. As shown, the timer 337 or 340 can be driven by a corresponding timing reference (e.g., timing reference 334 or 331) and can be employed by the device 103 to enforce proper timing of certain events. For example, as described above with reference to FIG. 2, overall response time 232 from a transmission (202) by the contactless reader 112 to a response by the device 103 can be very important (i.e., timing requirements may need to be precisely met). Upon receiving (205) a request from the contactless reader 112, the first interface 124 can load a predetermined value into the timer 337, then start the timer (e.g., initiate a backwards count by the timer 337 from the predetermined value to zero). After the timer 337 has been started (214), the first interface 124 can cause the requested information to be retrieved from, for example, the memory 324. When the timer 337 expires (e.g., reaches zero in this example), the retrieved information can be provided to the second interface 130 for communication to the contactless reader 112.

As described above, the predetermined value that is loaded into the timer 337 can be selected such that appropriate timing requirements are met. Various latencies in processing data in the device 103 can be accounted for by the predetermined value. For example, in some implementations, the response time 232 differs from the predetermined value by any latencies caused by receiving or decoding a request in the second interface 130, transmitting the request to the first interface 124 through the communication interface 133, and transmitting retrieved responsive data from the first interface 124 to the second interface 130 and back to the contactless reader 112.

In some implementations, the device 103 also includes one or more power storage devices (e.g., power storage devices 145A, 145B or 145C) that are separate from the primary power storage device 121. For example, as shown, one or more of the second interface 130, the communication interface 133 and the first interface 124 can include a power storage device such as a high efficiency capacitor or other device capable of storing at least small amounts of power for at least short periods of time. In some implementations (not shown), the integrated circuit card 127 can also include a power storage device.

Each power storage device can receive and store power in a first mode and supply power in a second mode, and a centralized power control 148 can manage the different modes. For example, when the power receiver 322 is actively receiving power (e.g., from the contactless reader 112 during a period 159, 162 or 179), the power controller 148 can distribute this power to one or more power storage devices (e.g., power storage devices 145A, 145B or 145C). When the power receiver 322 is not actively receiving power (e.g., during a period 182), the power controller 148 can distribute stored power to devices that may require power (e.g., one or more of the second interface 130, communication interface 133 or first interface 124).

In some implementations, the power controller 148 only distributes power that is stored in power storage devices 145A, 145B or 145C if sufficient power is not available from the primary power storage device 121. By distributing power that is stored in the power storage device 145A, 145B or 145C, the device 103 can, in some implementations, function in smart card applications, even if a battery associated with the device 103 (e.g., the primary power storage device 121) is dead. Practically speaking, this can, for example, allow a cell phone to be used in ticketing applications, even if the cell phone battery is dead.

In some implementations, the power controller 148 can perform other functions, such as transitioning certain circuits to a reduced-power state or a normal operating state. For example, upon receiving a request from the contactless reader 112, transmitting the request to the first interface 124 and starting the timer 337, the power controller 148 could cause the second interface 130 and the communication interface 133 to be transitioned to a reduced-power mode. In addition, while the integrated circuit card 127 is retrieving the information, portions of the first interface 124 could also be transitioned to a low-power mode (e.g., portions not needed for meeting timing requirements—such as portions other than the timing reference 334 and timer 337 in some implementations, or all portions of the first interface 124 if timing requirements are maintained through operation of the timer 340).

In some implementations, expiration of a timer can cause the power controller 148 to wake up appropriate circuits that were previously transitioned to reduced-power modes. For example, in implementations in which the second interface 130 and communication interface 133 are transitioned to a reduced-power mode while the integrated circuit card 127 is retrieving data, expiration of the timer 337 or 340 can cause the power controller 149 to wake up the communication interface 133 and second interface 130 in order to allow retrieved data to be communicated to the contactless reader 112 at an appropriate time.

Figure 4:
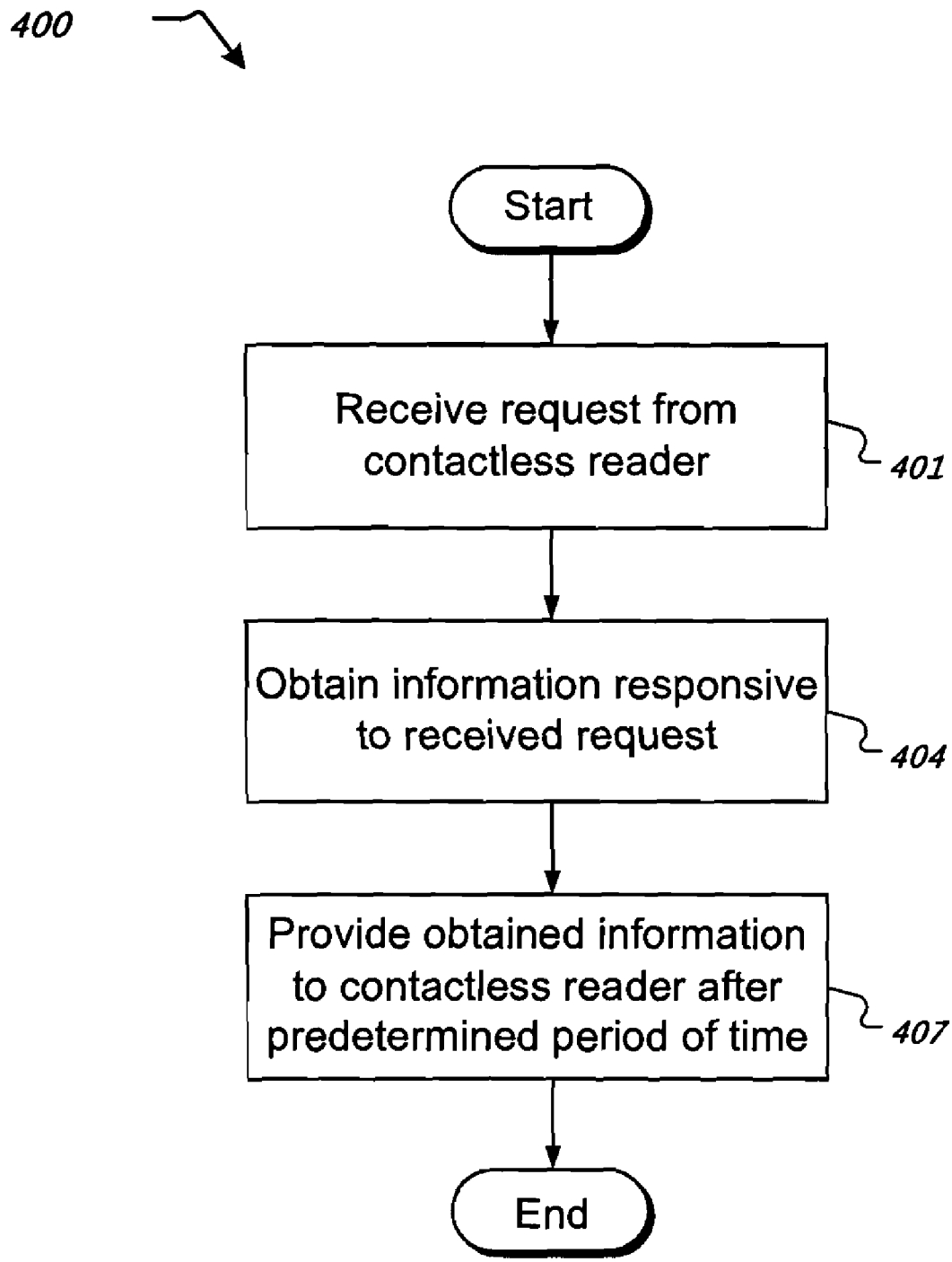
FIG. 4 is a flow diagram of an example method that a mobile device can employ to provide information to a contactless reader.

FIG. 4 is a flow diagram of an example method 400 that a mobile device can employ to provide information to a contactless reader. Referring to FIG. 1A, the method 400 can be employed, for example, to authenticate a user of the mobile device 103 as a valid ticket holder in a mass transit system. As another example, the method 400 can be employed in access-control applications, payment applications, or other applications in which information that is stored in a mobile device is provided to a contactless reader.

In one implementation as shown, the method 400 includes receiving (401), at an interface, an information request form an external contactless reader. For example, the method 400 can include receiving (401), at the second interface 130 of the mobile device 103, a request 139 from the contactless reader 112. In some implementations, the request 139 is a request for identification information or other information that is stored in the mobile device 103.

In some implementations, the request 139 is received (401) following detection by the mobile device 103 of the presence of the contactless reader 112 in close proximity to the mobile device 103. For example, circuitry in the second interface 130 can detect voltage that is induced by an interrogation signal (e.g., a time-varying electromagnetic field) propagated by the contactless reader 112.

In some implementations, the method 400 includes obtaining (404) information that is responsive to the received request from an integrated circuit card coupled to another interface of the mobile device. For example, with reference to FIG. 1A and FIG. 3, the method 400 can include obtaining (404) responsive information from the integrated circuit card 127. In particular, in some implementations, the mobile device 103 can employ the communications interface 133 and the first interface 124 to obtain (404) the responsive information from the integrated circuit card 127. The responsive information can be identification information, account information, device preference information, or other information that is securely stored in the integrated circuit card 127, and obtaining the responsive information can include decrypting or otherwise processing the responsive information by or in the integrated circuit card 127.

The method 400 can include providing (407) the obtained (404) information to the contactless reader after a predetermined period of time has elapsed. For example, in some implementations, the mobile device 103 includes a timer 337 or 340 that is started when the request 139 is received (401) by the second interface 130. When the timer reaches a predetermined value, the obtained (404) information can be provided (407) by the second interface 130 to the contactless reader 112 (e.g., as the response 142).

In some implementations, the interface is maintained in a reduced-power mode after the request is received (401) and before the predetermined period of time has elapsed (e.g., before a corresponding response is provided (407)). For example, as described above, the second interface 130 can be maintained in a reduced power mode while responsive information is being retrieved from the integrated circuit card 127.

In some implementations, the second interface 130 can also receive power from the contactless reader, and this power can be stored and selectively provided to various components of the mobile device 103 (e.g., when power from other sources is not available), such as the second interface 130, the first interface 124, the integrated circuit card 127, the timer 337 or 340, or other components. In such implementations, the method 400 can be performed even in the absence of other power (e.g., power from a battery 121).

A number of implementations have been described. Nevertheless, it will be understood that various modifications may be made without departing from the spirit and scope of the disclosed implementations. Accordingly, other embodiments are within the scope of the following claims.

What is claimed is:

1. A mobile device comprising:
a first interface configured to communicably couple to a removable integrated circuit card;
a second interface configured to wirelessly communicate with a contactless reader that is external to the mobile device;
a communication interface that couples the first interface and the second interface and that is configured to obtain information from a removable integrated circuit card that is coupled to the first interface and transmit the obtained information via the second interface to the contactless reader, wherein the communication interface is configured to obtain the information from the removable integrated circuit card upon receipt by the second interface of an information request from the contactless reader; and
a programmable timer that is configured to be started in response to receipt, by the second interface, of the information request,
wherein the second interface is configured to:
transition to a reduced power-mode when the programmable timer is started, and
receive power that is radiated by the contactless reader; and wherein at least one of the first interface, the second interface and the communication interface comprises a power storage device that is configured to store power received by the second interface and provide stored power to the first interface, the second interface and the communication interface.

2. The mobile device of claim 1, further comprising digital circuitry configured to provide information management functionality to a user of the mobile device.

3. The mobile device of claim 1, further comprising digital circuitry configured to provide wireless communication functionality to a user of the mobile device, wherein the first interface is configured to obtain information, from the integrated circuit card coupled to the first interface, that identifies at least one of a user of the mobile device, a wireless communication account associated with the mobile device, or a preferred wireless communication network to which the mobile device is configured to connect.

4. The mobile device of claim 1, wherein the integrated circuit card is a universal integrated circuit card (UICC) smart card configured to run at least one of a Subscriber Identity Module (SIM) application or a Universal Subscriber Identity Module (USIM) application.

5. The mobile device of claim 1, wherein the integrated circuit card is a Removable User Identity Module (RUIM).

6. The mobile device of claim 1, wherein the second interface is substantially compliant with at least one of International Organization for Standardization (ISO) standard 14443 type A communication, ISO standard 14443 type B communication, or ISO standard 15693 communication.

7. The mobile device of claim 1, wherein the power storage device is configured to selectively provide stored power to the first interface, the second interface and the communication interface when sufficient power is not available from a different, primary power storage device included in the mobile device.

8. The mobile device of claim 1, wherein the power radiated by the contactless reader is radiated discontinuously.

9. The mobile device of claim 1, wherein the second interface is configured to transition from the reduced-power mode to an operating mode when the programmable timer reaches a predetermined value, and following transition to the operating mode, to transmit the information obtained from the removable integrated circuit card to the contactless reader.

10. A mobile device comprising:
a first interface configured to communicably couple to a removable integrated circuit card;
a second interface configured to wirelessly communicate with a contactless reader that is external to the mobile device;
a communication interface that couples the first interface and the second interface and that is configured to obtain information from an integrated circuit card that is coupled to the first interface in response to receipt by the second interface of an information request from the contactless reader; and
a programmable timer that is configured to be started in response to receipt by the second interface of an information request from the contactless reader, and that is further configured to, upon reaching a programmed value, cause the second interface to transmit the obtained information to the contactless reader, wherein the second interface is configured to transition from an operating mode to a reduced-power mode after the programmable timer is started.

11. The mobile device of claim 10, wherein the second interface is configured to transition from the reduced-power mode to the operating mode when the programmable timer reaches the programmed value.

12. The mobile device of claim 10, wherein the second interface is configured to receive power that is radiated by the contactless reader.

13. The mobile device of claim 12, wherein power is discontinuously radiated by the contactless reader.

14. The mobile device of claim 13, further comprising a power storage device that is configured to store the power received by the second interface from the contactless reader and provide stored power to the first interface, the second interface and the communications interface.

15. The mobile device of claim 14, wherein the power storage device is configured to selectively provide stored power to the first interface, the second interface and the communications interface when sufficient power is not available from a different, primary power storage device included in the mobile device.

16. A method comprising:
receiving at a first interface an information request from an external contactless reader;
obtaining information that is responsive to the received information request from an integrated circuit card coupled to a second interface;
providing the obtained information to the contactless reader after a predetermined period of time has elapsed from a time the information request is received at the first interface; and
maintaining the first interface in a reduced-power mode after the information request is received at the first interface and before the predetermined period of time has elapsed.

17. The method of claim 16, further comprising receiving power that is radiated from the contactless reader.

18. The method of claim 17, wherein receiving power comprises receiving power that is radiated in a discontinuous manner from the contactless reader.

19. The method of claim 18, wherein providing stored power to the first interface and the second interface comprises selectively providing power when sufficient power is not available from a primary power storage device associated with the mobile device.

20. The method of claim 17, further comprising storing the received power, and providing stored power to the first interface and the second interface.

21. The method of claim 16, further comprising detecting the presence of the contactless reader in close proximity to the mobile device.

22. The method of claim 21, wherein detecting the presence of the contactless reader comprises detecting power that is radiated from the contactless reader.

23. The method of claim 16, wherein providing the obtained information to the contactless reader comprises providing the obtained information in substantial compliance with at least one of International Organization of Standardization (ISO) Standard 14443 or ISO Standard 15693.

24. The method of claim 23, wherein the predetermined period is selected based on timing parameters characterized by either ISO standard 14443 or ISO Standard 15693, and information-processing delays in the first interface and the second interface.

* * * * *